July 30, 1968  L. W. HAMLIN  3,395,260
SEALING MEANS FOR WATERPROOFING ELECTRICAL SWITCHES
Filed Dec. 18, 1967

INVENTOR
LEWIS W. HAMLIN
BY Raphael Semmes
ATTORNEY

United States Patent Office 3,395,260
Patented July 30, 1968

3,395,260
SEALING MEANS FOR WATERPROOFING
ELECTRICAL SWITCHES
Lewis W. Hamlin, Jacksonville, Ark., assignor to Hamlin Products, Inc., Little Rock, Ark., a corporation of Arkansas
Filed Dec. 18, 1967, Ser. No. 691,490
7 Claims. (Cl. 200—168)

ABSTRACT OF THE DISCLOSURE

Sealing means for a switch actuating shaft extending through an opening in the top wall of a switch housing for connection at one end to a switch therein. The opposite end of the shaft is connected to an operating dial, externally overlying the housing wall adjacent the shaft, and a bushing embraces the shaft within the shaft opening and extends partially into the operating dial. A pressure plate underlies the top wall and is provided with an opening for receiving a portion of the bushing located within the housing. This opening is countersunk to receive an O-ring which surrounds the bushing and normally lies partially above the upper surface of the pressure plate for contacting the underside of the housing wall. The housing wall and pressure plate are drilled on opposite sides of the shaft and bushing opening to receive tightening screws which engage tapped openings in a yoke which underlies the pressure plate. The screws are sealed by means of O-rings located in countersunk holes in the upper surface of the pressure plate so that when the screws are tightened, both the central O-ring around the shaft and bushing and the O-rings around the tightening screws are flattened against the undersurface of the top wall of the housing to seal all three openings.

Background of invention

Conventional electric switches for use on such outdoor equipment as electric barbecue apparatus have presented a problem in that, so far as I am advised, none have been developed which are truly waterproof and obtained the unconditional approval of Underwriters Laboratories. While some structures have been approved by U.L., in each instance U.L. has required that the name plate on the product is "U.L. approved for outdoor use but do not use in the rain."

The invention

It is the object of the present invention to provide a sealing means for a switch actuating shaft extending through an opening in the top wall of the switch housing which avoids the above-noted objections and is particularly adaptable for use with the electric control of electric barbecue apparatus.

Another object of the invention resides in the novel use and placement of O-rings in combination with a pressure plate for sealing the switch actuating shaft.

A further object is to provide a switch sealing means which is simple in construction, easy to assemble, and highly effective in the protection of outdoor switches.

With the above and other objects in view which will appear as the description proceeds, the invention consists in the novel features herein set forth, illustrated in the accompanying drawings, and more particularly pointed out in the appended claims.

The drawings

Referring to the drawings in which numerals of like character designate similar parts throughout the several views.

Specification

Figure 1:
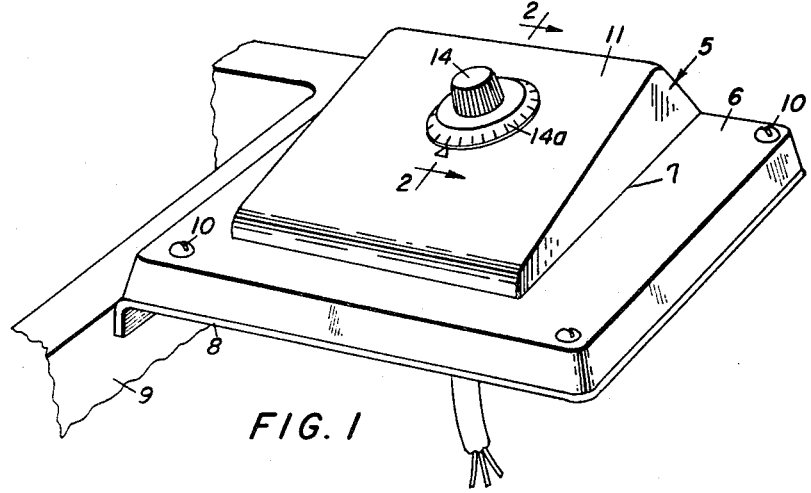
FIG. 1 is a perspective view of a switch housing embodying the sealing means of the present invention.

In the drawings, referring first to FIG. 1, the switch housing is generally indicated by the numeral 5 and is of a type wherein the junctions of all walls are sealed by any suitable means, such as welding, to prevent the entrance of water. In the particular embodiment of the invention illustrated, the housing is provided with a base or bottom wall 6 which extends longitudinally and laterally beyond the sealed junctions 7 of its side walls for mounting on a platform 8, attached to the frame 9 of an outdoor cooker or barbecue apparatus. Screws 10, or any other suitable means, may be employed for securing the bottom wall 6 to the platform 8.

Figure 2:
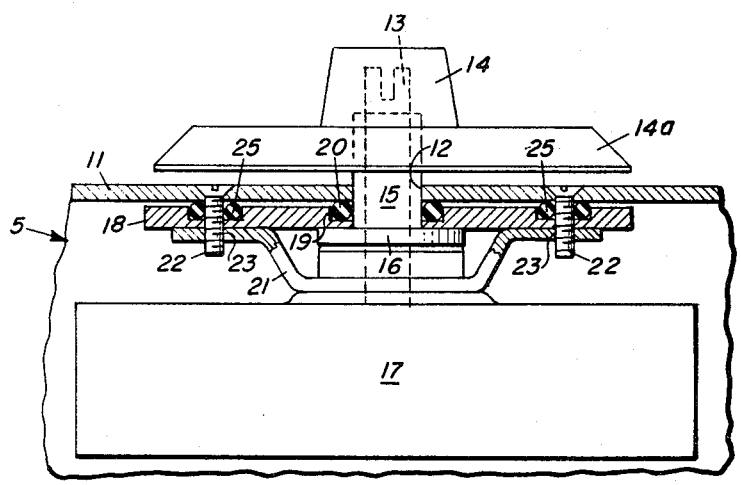
FIG. 2 is an enlarged, sectional view taken on line 2—2 of FIG. 1.
Figure 3:
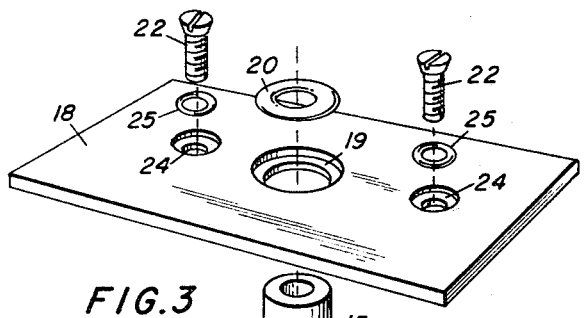
FIG. 3 is an exploded view of the pressure plate and O-ring assembly of the invention.

As best seen in FIG. 2, the top wall 11 of the housing 5 is provided with a centrally located opening 12 through which the upper end of the switch shaft 13 is adapted to pass for insertion within and connection to an operating dial 14. A bushing 15, preferably provided at its lower end with a radially enlarged flange 16, surrounds the shaft 13 and extends through the opening 12 and into the dial 14, sufficient rotary clearance being provided between the shaft and bushing to permit the actuation of the shaft in operating the switch, schematically shown at 17, within the housing 5. Preferably, the base portion 14a of the dial 14 is radially enlarged to overlie and, to some extent, protect the opening 12 in the top wall of the housing.

A pressure plate 18 underlies the top wall 11 of the housing in parallel, spaced relation, and is provided with a central, countersunk opening 19 which is concentric with the opening 12 in the top wall 11. The bushing 15 extends through this countersunk opening 19, with its flange 16 lying beneath the pressure plate 18, and the countersink receives a central O-ring 20 which is of a thickness to normally extend partially above the top surface of the pressure plate, entirely around the bushing for engagement with the undersurface of the top wall 11. A freely mounted bracket 21 underlies the pressure plate 18, and on opposite sides of the central opening 12, the top plate 11 and pressure plate 18 are concentrically drilled to receive screws 22 which extend through tapped openings 23 at opposite ends of the bracket 21. Each of the screw holes in the pressure plate is countersunk from the upper surface thereof as at 24 to accommodate O-rings 25 which, as in the case of the central O-ring 20, are of a thickness to normally extend partially above the upper surface of the pressure plate 18 for engagement with the undersurface of the top wall 11.

In assembly, the shaft 13 with the bushing 15 thereon is inserted through the registering central openings 12 and 19 in the top wall and pressure plate, respectively. The bracket 21 is then applied beneath the pressure plate with the O-rings 20 and 25 in place in their respective countersinks. Screws 22 are then installed and tigthened in the tapped openings 23 of the bracket so as to draw the pressure plate closely against the underside of the top wall 11, while, at the same time, compressing the O-rings in their countersinks to seal both the central opening 12 and the openings which receive the screws 22. The dial 14 is then placed on the upper end of the shaft 13 where it is operatively connected by any suitable means.

Thus, the overhanging base 14a of the dial provides a certain extent of protection to the openings in the top wall, while a positive sealing of the shaft and screws is effected by the tightening of the pressure plate and compression of the O-rings.

In this connection, it is desirable that the areas of the screws 22, which engage the O-rings 25, be unthreaded to provide solid contact areas for the O-rings when they are compressed. If these screws were threaded throughout, there would be the possibility of leakage along the threads.

From the foregoing, it is believed that the invention may be readily understood by those skilled in the art without further description, it being borne in mind that numerous changes may be made in the details disclosed without departing from the spirit of the invention as set forth in the following claims.

I claim:

1. In an electric, waterproof switch housing having a switch actuating shaft extending through an opening in one wall thereof, with an operating dial connected to its upper end, sealing means for said shaft and opening, comprising a pressure plate lying in parallel, spaced relation to the inner surface of said wall, an opening in said pressure plate concentric with the shaft opening in said wall, said pressure plate opening being countersunk around said shaft, an O-ring in said countersunk opening of such a thickness that a portion of its periphery normally extends into the space between said pressure plate and wall for engagement with the latter, and screw-threaded means tightening said pressure plate against said wall to compress said O-ring and seal said shaft and shaft opening.

2. A device as claimed in claim 1, wherein said last-named means comprises aligned, drilled openings in said wall and pressure plate on either side of said shaft opening, said drilled openings in said pressure plate being countersunk, O-rings in said countersunk openings, screws inserted in said aligned openings, and means threadedly engaging the inner ends of said screws in abutment with the underside of said pressure plate, whereby the tightening of said screws compresses the O-ring surrounding said shaft and those surrounding said screws.

3. A device as claimed in claim 2, wherein said threaded means comprises a bracket freely underlying said pressure plate for engagement by said screws.

4. A device as claimed in claim 1, wherein said dial radially overlies said shaft opening.

5. A device as claimed in claim 1, wherein a bushing surrounds said shaft between the latter and the openings in said wall and pressure plate, respectively.

6. A device as claimed in claim 5, wherein said bushing is provided with a radial flange which underlies said pressure plate adjacent its shaft-receiving opening.

7. A device as claimed in claim 2, wherein said screws are unthreaded in the areas which engage said O-rings.

References Cited

UNITED STATES PATENTS

| 2,522,172 | 9/1950 | Gates | 200—168 |
| 2,565,863 | 8/1951 | Linn | 200—168 |
| 2,650,964 | 9/1953 | Razdow | 200—168 |
| 2,748,220 | 5/1956 | Lung | 200—168 XR |

ROBERT K. SCHAEFER, *Primary Examiner.*

H. O. JONES, *Assistant Examiner.*